US007002491B2

(12) United States Patent
Robbins (10) Patent No.: US 7,002,491 B2
(45) Date of Patent: Feb. 21, 2006

(54) SYSTEM AND METHOD FOR FILTERING FAR EAST LANGUAGES

(75) Inventor: Daryn E. Robbins, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 10/287,836

(22) Filed: Nov. 5, 2002

(65) Prior Publication Data

US 2003/0206123 A1 Nov. 6, 2003

Related U.S. Application Data

(60) Provisional application No. 60/377,295, filed on May 2, 2002.

(51) Int. Cl.
*H03K 17/94* (2006.01)

(52) U.S. Cl. .................. 341/28; 379/368; 345/171
(58) Field of Classification Search .................. 341/28, 341/22, 23; 455/464; 379/368; 345/171
See application file for complete search history.

(56) References Cited

U.S. PATENT DOCUMENTS

| | | | |
|---|---|---|---|
| 5,729,618 A | | 3/1998 | Fujisawa et al. |
| 6,044,365 A | | 3/2000 | Cannon et al. |
| 6,300,934 B1 | * | 10/2001 | Ko et al. .................. 345/467 |
| 6,646,573 B1 | * | 11/2003 | Kushler et al. ............. 341/28 |
| 6,686,852 B1 | * | 2/2004 | Guo ............................ 341/22 |
| 6,822,585 B1 | * | 11/2004 | Ni et al. ....................... 341/28 |

OTHER PUBLICATIONS

Tang, Y. Y.; Feng Yang; Jiming Liu, *Basic processes of Chinese character based on cubic B-spline wavelet transform*. Dec. 2001. IEEE Transaction on Pattern Analysis and Machine Intelligence vol. 23, No. 12, pp. 1443-1449.

http://czyborra.com/unicode/characters.html. *Unicode's Characters*. Printed Jan. 29, 2003, pp. 1-10.

Deng, Da; Chan, K.P.; Yu, Yinglin. *Handwritten Chinese character recognition using spatial Gabor filters and self-organizing feature maps*. Nov. 13, 1994 to Nov. 16, 1994. Proceedings of the IEEE International Conference on Image Processing. Part 3 (of 3) in Austin, TX, pp. 940-944.

Larmagnac, J.-P.; Dinet, E. *A stroke extraction method for offline recognition of Chinese characters*. Proceedings of the SPIE—The International Society for Optical Engineering, vol. 3967-2000, pp. 32-41.

(Continued)

*Primary Examiner*—Michael Horabik
*Assistant Examiner*—Hung Q. Dang
(74) *Attorney, Agent, or Firm*—Merchant & Gould P.C.

(57) ABSTRACT

A system and method is directed to filtering an entry associated with a Far East language character. A potential keystroke is determined for each entry in a database, contact list, text file, and the like. In one embodiment, the entry is a Unicode associated with the Far East language character. An index is determined from the Unicode based in part on the Far East language character. The index is employed to determine the potential keystroke associated with the Far East language character. If the potential keystroke approximately matches a received keystroke, the entry associated with the Far East language character is selected. In one embodiment, the Far East language character associated with the selected entry is provided to a display device. The Far East language character may include a Korean, Japanese, and Chinese language character.

14 Claims, 6 Drawing Sheets

OTHER PUBLICATIONS

Masui, T. *An efficient text input method for pen-based computers. Human Factors in Computing Systems.* 1998. Conference Proceedings, vol. 2, pp. 328-335.

Pai, Tun-Wen; Shyu, Keh-Hwa; Chen, Ling-Fan; Tai, Gwo-Chin. *Mathematical morphology-based shape feature analysis for Chinese character recognition systems.* 1995. Proceedings of SPIE—The International Society for Optical Engineering v 2501/2, pp. 922-930.

Rajaraman, K.; Lai, K. F.; Changwen, Y. *Experiments on proximity based Chinese text retrieval in TREC 6.* 1998. Sixth Text REtrieval Conference, pp. 559-566.

* cited by examiner

| Choseong Table | Jungseong Table | Jongseong Table |
|---|---|---|
| JAMOS_G, //G | JAMOS_A, //A | JAMOS_EMPTY, // |
| JAMOS_GG, //GG | JAMOS_AE, //AE | JAMOS_G, //G |
| JAMOS_N, //N | JAMOS_YA, //YA | JAMOS_GG, //GG |
| JAMOS_D, //D | JAMOS_YAE, //YAE | JAMOS_GS, //GS |
| JAMOS_DD, //DD | JAMOS_EO, //EO | JAMOS_N, //N |
| JAMOS_L, //L (or R) | JAMOS_E, //E | JAMOS_NJ, //NJ |
| JAMOS_M, //M | JAMOS_YEO, //YEO | JAMOS_NH, //NH |
| JAMOS_B, //B | JAMOS_YE, //YE | JAMOS_D, //D |
| JAMOS_BB, //BB | JAMOS_O, //O | JAMOS_L, //L (or R) |
| JAMOS_S, //S | JAMOS_WA, //WA | JAMOS_LG, //LG |
| JAMOS_SS, //SS | JAMOS_WAE, //WAE | JAMOS_LM, //LM |
| JAMOS_EMPTY, // | JAMOS_OE, //OE | JAMOS_LB, //LB |
| JAMOS_J, //J | JAMOS_YO, //YO | JAMOS_LS, //LS |
| JAMOS_JJ, //JJ | JAMOS_U, //U | JAMOS_LT, //LT |
| JAMOS_C, //C | JAMOS_WEO, //WEO | JAMOS_LP, //LP |
| JAMOS_K, //K | JAMOS_WE, //WE | JAMOS_LH, //LH |
| JAMOS_T, //T | JAMOS_WI, //WI | JAMOS_M, //M |
| JAMOS_P, //P | JAMOS_YU, //YU | JAMOS_B, //B |
| JAMOS_H //H | JAMOS_EU, //EU | JAMOS_BS, //BS |
| | JAMOS_YI, //YI | JAMOS_S, //S |
| | JAMOS_I //I | JAMOS_SS, //SS |
| | | JAMOS_NG, //NG |
| | | JAMOS_J, //J |
| | | JAMOS_C, //C |
| | | JAMOS_K, //K |
| | | JAMOS_T, //T |
| | | JAMOS_P, //P |
| | | JAMOS_H //H |

Equivalence Mapping

JAMOS_G:JAMOS_GG:JAMOS_N::JAMOS_D: JAMOS_DD: JAMOS_L:
JAMOS_M:JAMOS_B:JAMOS_BB:JAMOS_S:JAMOS_SS:JAMOS_J::JAMOS_JJ:
JAMOS_C:JAMOS_K :JAMOS_T:JAMOS_P:JAMOS_H:JAMOS_A:JAMOS_AE:
JAMOS_YA:JAMOS_YAE:JAMOS_EO:JAMOS_E:JAMOS_YEO:JAMOS_YE:
JAMOS_O:JAMOS_WA:JAMOS_WAE:JAMOS_OE:JAMOS_YO:JAMOS_U:
JAMOS_WEO:JAMOS_WE:JAMOS_WI:JAMOS_YU:JAMOS_EU:JAMOS_YI:
JAMOS_I:JAMOS_GS:JAMOS_NJ:JAMOS_NH:JAMOS_LG:JAMOS_LM:
JAMOS_LB:JAMOS_LS:JAMOS_LT:JAMOS_LP:JAMOS_LH:JAMOS_BS:
JAMOS_NG:

Potential Keystroke Table

SYSTEM AND METHOD FOR FILTERING FAR EAST LANGUAGES

CROSS REFERENCE TO RELATED APPLICATIONS

This application claims the benefit of U.S. Provisional Application Ser. No. 60/377,295, filed May 2, 2002, the benefit of the earlier filing date of which is hereby claimed under 35 U.S.C. § 119 (e).

FIELD OF THE INVENTION

The present invention relates to text filtering, and more particularly to filtering an entry that includes a Far East language character.

BACKGROUND OF THE INVENTION

Today's population is multicultural, and multilingual. To respond to such a diverse population, technology suppliers have recognized the need for a computing device that enables users to communicate with the computing device in their own language. To this end, numerous computing devices enable the user to enter non-English language characters, such as Far East language characters. Many of these computing devices employ what is known as an input method editor (IME).

An IME, also known as a front-end processor, typically includes an applet that allows a user to enter the different characters used in Far East languages, and the like, with a standard 101-key keyboard. An IME may convert keystrokes into phonetic and ideographic characters. As the user enters a keystroke, the IME attempts to guess into which ideographic character or characters the keystrokes should be converted.

However, for the Far East languages it may require several keystrokes to produce one character. This makes traditional IMEs complex and slow to use. Moreover, many of today's IMEs require the full range of keystrokes available through the 101-key keyboard. This often makes traditional IMEs impractical for mobile computing devices such as smart phones, personal digital assistants (PDAs), and the like. Moreover, because of these limitations, and others, traditional IMEs are unsuitable for quickly searching a database, contact list, and the like, that includes an entry associated with a Far East language character. Therefore, it is with respect to these considerations and others that the present invention has been made.

SUMMARY OF THE INVENTION

This summary of the invention section is intended to introduce the reader to aspects of the invention and is not a complete description of the invention. Particular aspects of the invention are pointed out in other sections herein below, and the invention is set forth in the appended claims, which alone demarcate its scope.

The present invention provides a system, apparatus, and methods for filtering an entry associated with a Far East (FE) language character. An entry may correspond to information associated with an individual's contact information. For example, the entry may include a name that includes a FE language character. A potential keystroke is determined for each entry in the database, contact list, text file, and the like. As the user enters a keystroke, the invention compares the potential keystroke for each entry to determine if a match exists with the entered keystroke. If a match exists, the entry is displayed to the user. As additional keystrokes are entered, the displayed entries may be reduced. By determining potential keystrokes from the entries, the number of keystrokes that the user needs to enter to obtain a desired entry may be reduced.

In one aspect of the present invention, the system is directed to a computer-readable medium having computer executable instructions for filtering an entry associated with a FE language character. The instructions include receiving a keystroke and the entry associated with the FE language character. The instructions further include determining a potential keystroke based on the entry. If the potential keystroke approximately matches the received keystroke, the entry associated with the FE language character is selected.

In another aspect of the present invention, an apparatus is directed to filtering an entry associated with a FE language character. The apparatus includes a database, an input module, and a smart filter. The database is configured to store an entry. The entry is associated with the FE language character. The input module is configured to provide an input keystroke. The smart filter is coupled to the database and input module, and is configured to perform actions. The smart filter is configured to receive the input keystroke and the entry. The smart filter is further configured to determine a potential keystroke based on the entry, and if the potential keystroke approximately matches the input keystroke, select the entry.

In still another aspect of the present invention, in a computer device having a graphical user interface and a user input mechanism, a method is directed to filtering an entry in a contact database. The method includes receiving an input from the user input mechanism, and determining an input keystroke based on the input. The method further includes receiving the entry in the contact database, where the entry is associated with a FE language character. Moreover, the method also includes determining a potential keystroke based on the entry, and if the potential keystroke approximately matches the input keystroke, displaying on the graphical user interface the FE language character associated with the entry.

In yet another aspect of the present invention, a method is directed to identifying a keystroke for a FE language character. The method includes receiving a code associated with a FE language character, determining an index based at least in part on the code associated with the FE language character, and employing the index to identify the keystroke, the selected keystroke being associated with the FE language character.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 3 is an illustrative diagram of one embodiment for smart table 206 of FIG. 2;

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed to a system and method for filtering an entry associated with a FE language character. A potential keystroke is determined for an entry in a database, contact list, text file, and the like. In one embodiment, the entry employs a Unicode Standard code associated with a FE language character. An index is determined from the Unicode Standard code based in part on a leading consonant, vowel, and a trailing consonant associated with the FE language character. The index is employed to determine the potential keystroke associated with the FE language character. If the potential keystroke approximately matches a received keystroke, the entry is selected. In one embodiment, the FE language character associated with the selected entry is provided to a display device. The FE language character associated with the entry may include a Japanese, traditional Chinese, and modern Chinese language character.

Illustrative Environment

Figure 1:
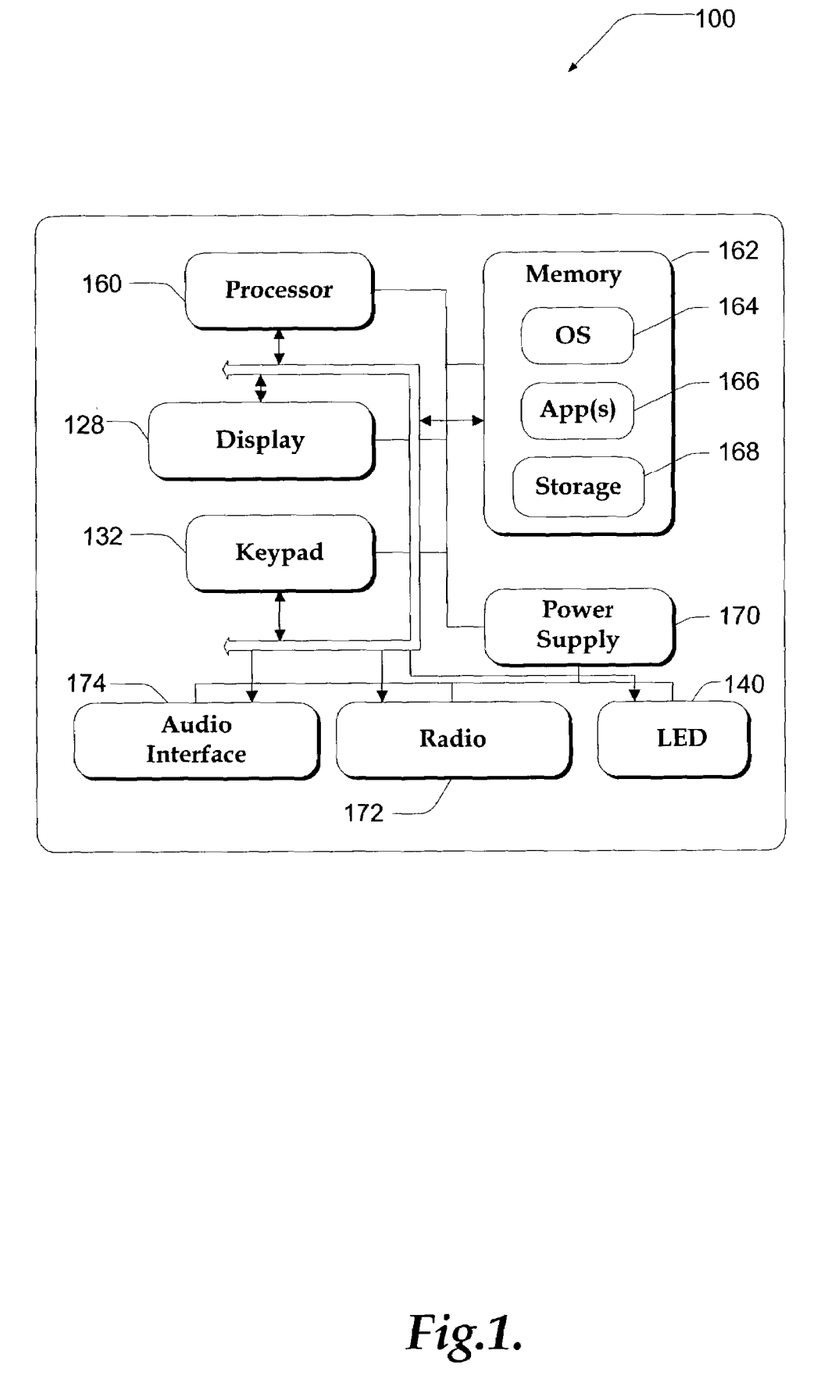
FIG. 1 is a functional block diagram illustrating an embodiment of an exemplary communications device for practicing the present invention.

FIG. 1 is a functional block diagram illustrating an embodiment of an exemplary communications device 100 for practicing the present invention. In one embodiment of the present invention communications device 100 is implemented as a mobile communications device, such as a personal digital assistant (PDA), smart phone, and the like. Communications device 100 may also include handheld computers, tablet computers, personal computers, multiprocessor systems, microprocessor-based or programmable consumer electronics, network PCs, wearable computers, and the like.

Communications device 100 may include many more components than those shown in FIG. 1. The components shown, however, are sufficient to disclose an illustrative embodiment for practicing the invention.

As shown in the figure, communications device 100 includes processor 160, memory 162, display 128, and keypad 132. Memory 162 generally includes both volatile memory (e.g., RAM) and non-volatile memory (e.g., ROM, Flash Memory, or the like). Communications device 100 includes an operating system 164, such as the Windows CE operating system from Microsoft Corporation or other such operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile communications devices. For example, display 128 may be touch-sensitive, and would then also act as an input device enabling entry of FE language strokes.

One or more application programs 166 are loaded into memory 162 and run on the operating system 164. Examples of application programs include phone dialer programs, content manager, email programs, scheduling programs, word processing programs, spreadsheet programs, smart filter, and so forth. Communications device 100 also includes non-volatile storage 168 within memory 162. Non-volatile storage 168 may be used to store persistent information which should not be lost if the communications device 100 is powered down. The application programs 166 may use and store information in storage 168, such as e-mail or other messages used by an email application, contact information, databases, and the like, used by the content manager, appointment information used by a scheduling program, documents used by a word processing application, and the like. A synchronization application may also reside on communications device 100 and is programmed to interact with a corresponding synchronization application resident on a host computer to keep the information stored in storage 168 synchronized with corresponding information stored at the host computer.

Communications device 100 also includes power supply 170, which may be implemented as one or more batteries. Power supply 170 might further include an external power source, such as an AC adapter or a powered docking cradle that supplements or recharges the batteries.

Communications device 100 is also shown with two types of external notification mechanisms: LED 140 and audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Communications device 100 also includes radio 172 that performs the function of transmitting and receiving radio frequency communications. Radio 172 facilitates wireless connectivity between communications device 100 and the outside world, via a communications carrier or service provider. Transmissions to and from radio 172 are conducted under control of operating system 164. In other words, communications received by radio 172 may be disseminated to application programs 166 via operating system 164, and vice versa.

Radio 172 allows communications device 100 to communicate with other computing devices, such as over a network. Radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
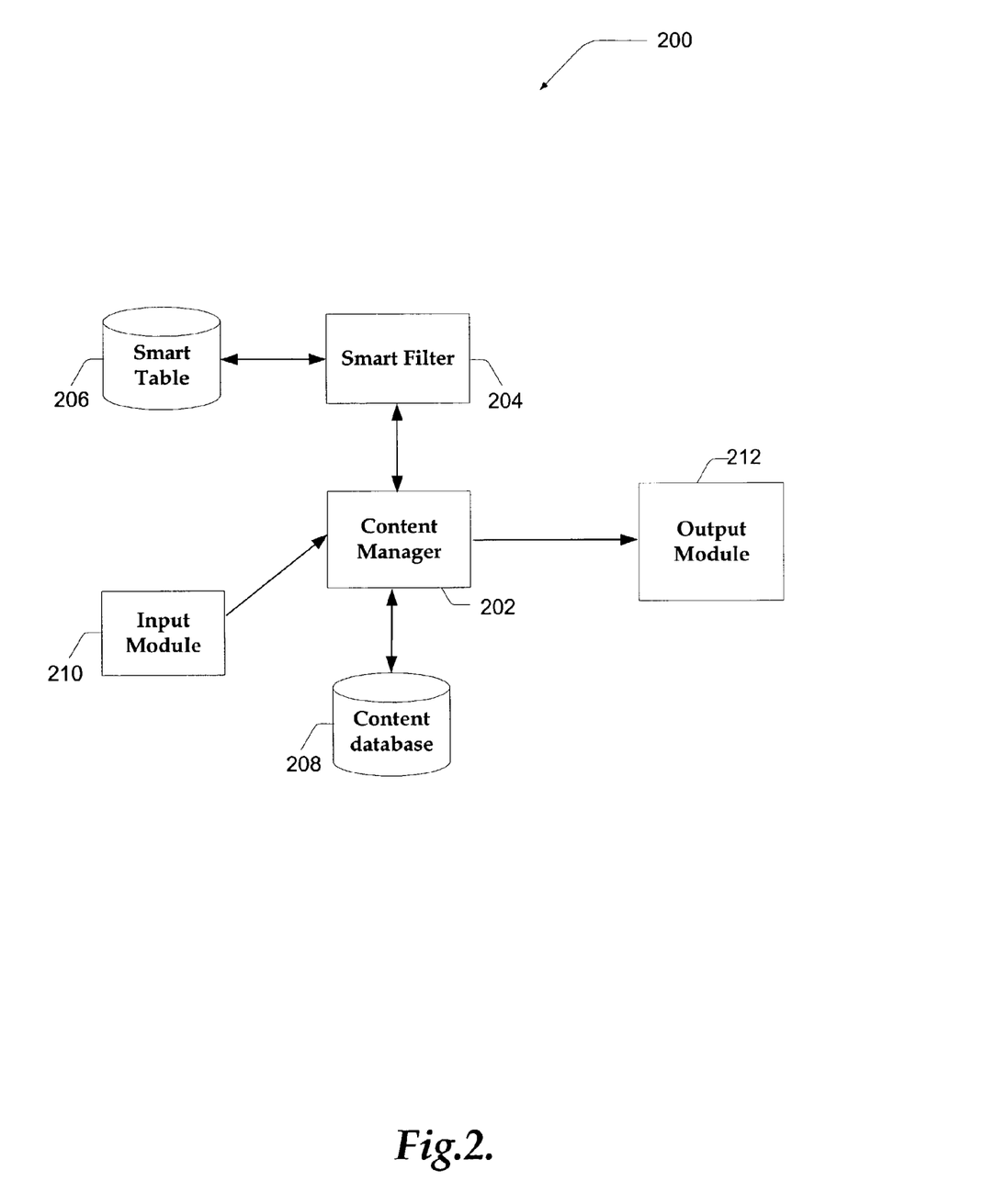
FIG. 2 is a functional block diagram of one embodiment of components in communications device 100 of FIG. 1 for filtering an entry associated with a FE language.

FIG. 2 is a functional block diagram for one embodiment of components for filtering an entry associated with a FE language, in accordance with the present invention. System 200 may be employed in communication device 100 shown in FIG. 1.

System 200 includes content manager 202, smart filter 204, smart table 206, content database 208, input module 210, and output module 212. System 200 may include many more components than those shown in FIG. 2. The components shown, however, are sufficient to disclose an illustrative embodiment for practicing the invention.

As shown in the figure, content manager 202 is in communication with smart filer 204, output module 212, content database 208, and input module 210. Moreover, smart filter 204 is also in communication with smart table 206.

Input module 210 may include a keypad, touch-sensitive device, or the like configured to receive a keystroke or a FE language stroke, or both. Input module 210 may further include a buffer that is configured to store the received keystroke, and the FE language stroke. Because, a FE language stroke may include inputs indicating a FE character brushstroke, and the like, rather that an alphanumeric keystroke entry, input module 210 is also enabled to determine a keystroke based in part on the FE language stroke. In any event, input module 210 is further arranged to provide the keystroke to content manager 202 upon request.

Content database 208 is configured to provide storage for a plurality of entries. The entries enable a computing device, such as communications device 100 in FIG. 1 to represent a FE language character. In one embodiment, the entries employ a Unicode Standard code to represent the FE language character.

Content database 208 may represent a contact list, call log, document, document name, and the like, where each entry includes or is associated with a FE language character. For example, if content database 208 represents a contact list, one entry may correspond to an individual's contact information. In this case, the entry may include a name in a FE language. Thus, the entry is associated with or includes at least one FE language character, such as the first character of the individual's name.

Moreover, content database 208 is further configured to provide at least one entry to content manager 202 upon request.

Output module 212 includes virtually any display device that enables one to view a FE language character. For example, output module 212 includes LED devices, LCD devices, printer devices, and similar display devices.

Output module 212 is configured to receive characters, bitmaps, and the like from content manager 202 for display. In one embodiment, the received characters include an entry from content database 208.

Content manager 202 is configured to receive input keystrokes from input module 210 and an entry from content database 208. In one embodiment, content manager 202 receives a plurality of entries from content database 208.

Content manager 202 is also configured to provide the input keystroke and the entry to smart filter 204. In one embodiment, content manager 202 provides a subset of an entry, rather than the entire entry in content database 208. Content manager 202 is configured to receive a signal from smart filter 204 that indicates whether a potential keystroke determined from the FE language character associated with the entry approximately matches the input keystroke. Content manager 202 further manages a buffered list of entries associated with the matching potential keystroke. The buffered list enables content manager 202 to reduce the number of entries that are evaluated when another keystroke is input. Content manager 202 is also configured to provide the entry to output module 212 for display.

Smart table 206 includes tables, algorithms, matrices, and the like configured to enable a determination of a potential keystroke. The potential keystroke represents a keystroke that the user may have entered to generate a FE language character.

Briefly referring to FIG. 3, an illustrative diagram is shown for one embodiment of smart table 206 for Korean language characters.

A Korean language character, known as a Hangul, includes Jamos, or syllables. Each Hangul has three Jamos, a leading consonant (Choseong), a vowel (Jungseong), and a trailing consonant (Jongseong). A Hangul need not have a leading consonant, or a trailing consonant. Moreover, there are a variety of programmatic approaches that map the three parts of the Hangul to the Jamos and from Jamos to keystrokes, or similar representations. One approach employs three nested program loops to map the three parts of the Hangul to the Jamos. An outer program loop, such as a for-loop, do-loop, or the like, is employed to map the Choseong. A second, inner program loop maps the Jungseong, and the third inner loop is employed to map the Jongseong. The three nested program loops may also be employed to provide an index for each part. These indices may then be employed to index into a table of keystrokes associated with each Jamos character and when these keystrokes are concatenated together in order they form the keystroke for the given Hangul.

Briefly referring to FIG. 3, the three nested program loops are illustrated as three tables; Choseong table 302, Jungseong table 304, and Jongseong table 306. Also shown in FIG. 3 is equivalence mapping 308, and potential keystroke table 310. Equivalence mapping 308 is employed for mapping Jamos from one of the three tables, above, into potential keystroke table 310, to obtain a potential keystroke associated with an entry.

Returning to FIG. 2, smart filter 204 employs smart table 206 to determine a potential keystroke based in part an entry received from content manager 202. Smart filter 204 may be configured to determine a potential keystroke for a variety of FE language characters, including Korean, Japanese, modern Chinese, and traditional Chinese characters, and the like.

Smart filter 204 is enabled to compare the potential keystroke to the input keystroke and provide a signal to content manager 202 indicating whether the potential keystroke approximately matches the input keystroke.

In one embodiment, smart table 204 is configured to determine an index into Choseong table 302, Jungseong table 304, and Jongseong table 306, shown in FIG. 3, based in part on the received entry. The index enables smart filter 204 to employ equivalence mapping 308 to further index into keystroke table 310, and thereby determine a potential keystroke for the Jamos associated with the received entry.

Generalized Operation

Figure 4:
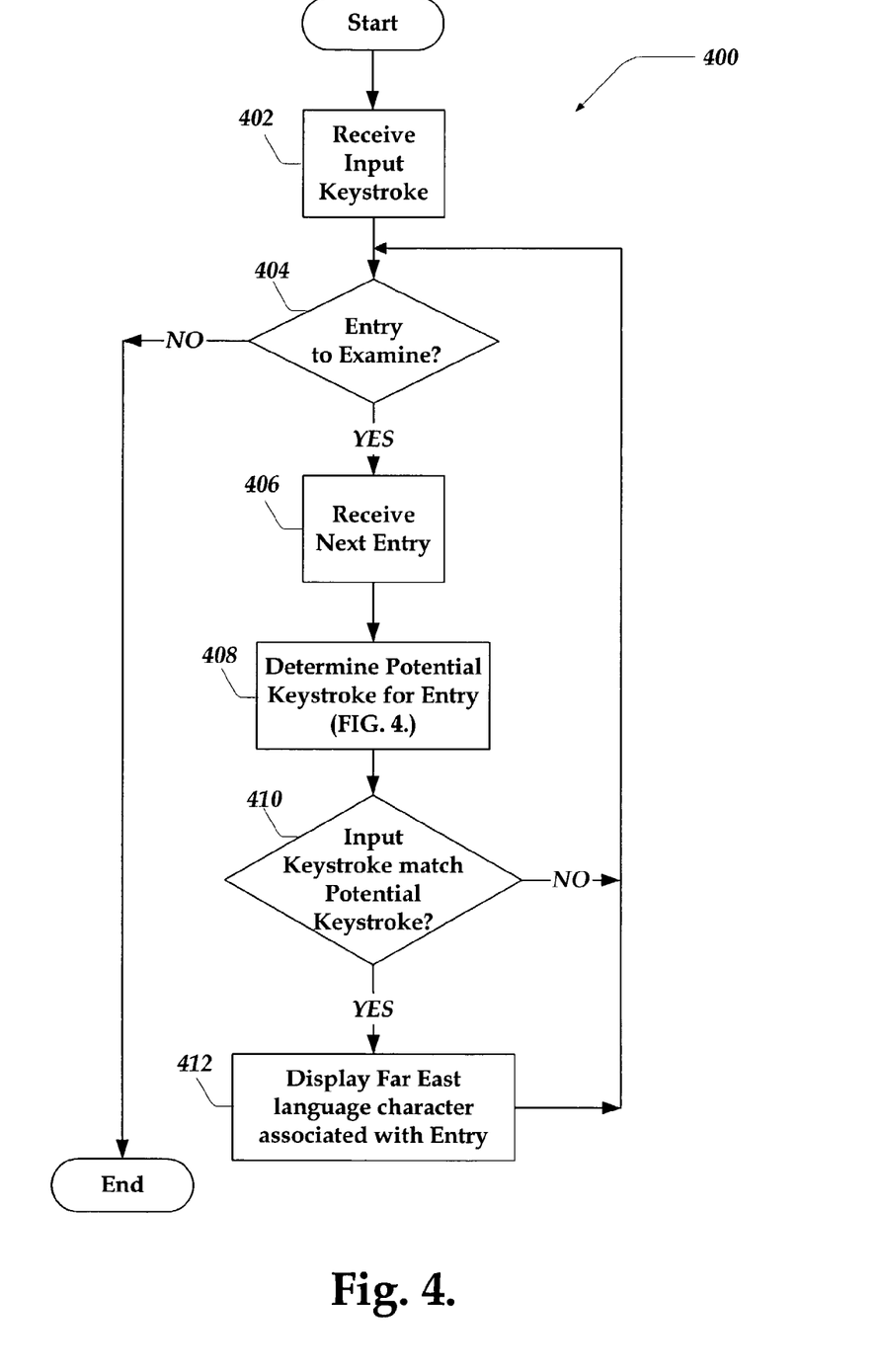
FIG. 4 is a flow diagram generally showing one embodiment of a process of filtering an entry associated with a FE Language.

The operation of certain aspects of the present invention will now be described with respect to FIGS. 4–5. FIG. 4 is a flow diagram generally showing one embodiment for a process of filtering an entry associated with a FE language character, in accordance with the present invention.

Process 400 begins, after a start block, at block 402, where an input keystroke is received. The input keystroke includes an alphanumeric keystroke such as determined from a traditional telephone touch keypad, or the like. Process 400 then proceeds to decision block 404 where a determination is made whether there is an entry to be examined. In one embodiment, the entry is represented by a Unicode Standard code associated with a FE language character within the entry.

If, at decision block 404, it is determined that no more entries are to be examined, the process ends. Alternatively, if, at decision block 404, it is determined that there are more entries to be examined, process 400 continues to block 406, where a next entry is received.

At block 408, a potential keystroke is determined from the received entry. The operations performed at block 408 are described in detail in conjunction with FIG. 5. Briefly, stated, however, a determination is made of the first keystroke that would be entered to identify the FE character associated with the entry. That keystroke is the potential keystroke.

At decision block 410, a determination is made whether the input keystroke approximately matches the potential keystroke(s). If it is determined that the input keystroke does not approximately match the potential keystroke(s), the process returns to decision block 404, to perform actions substantially as described above. Alternatively, if, at decision block 410, it is determined that the input keystroke does approximately match the potential keystroke(s), the process continues to block 412, where the entry that includes the FE language character is displayed. The process next returns to decision block 404, to perform actions substantially as described above until no more entries are to be examined. Upon completion, process 400 ends.

Figure 5:
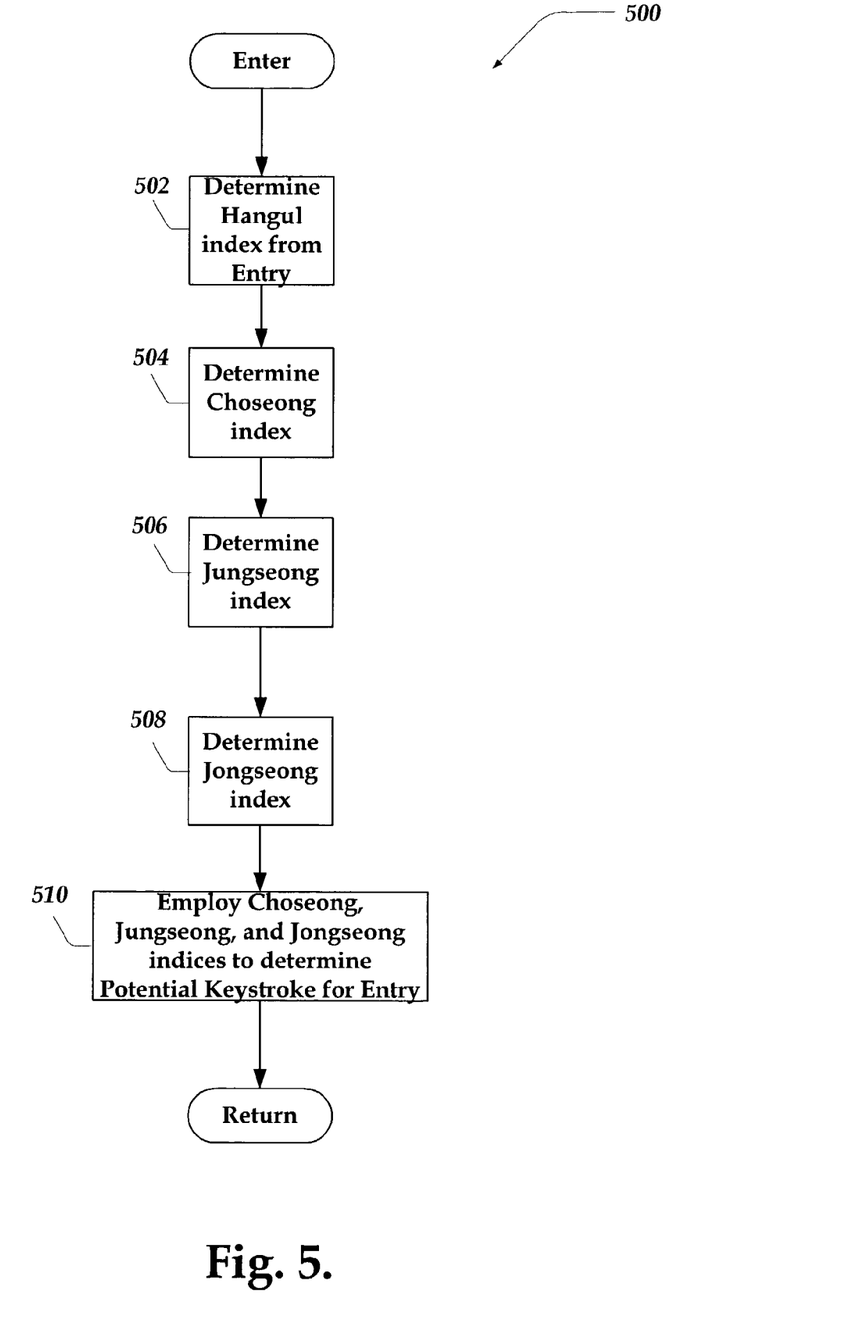
FIG. 5 is a flow diagram generally showing one embodiment of a process of determining a potential keystroke associated with a Korean language character.

FIG. 5 is a flow diagram generally showing one embodiment for a process of determining a potential keystroke associated with a Korean language character, in accordance with the present invention. Process 500 may include different actions for another FE language. The actions shown, however, are sufficient to disclose an illustrative embodiment for practicing the invention.

Process 500 employs a Unicode Standard code that is in the hexadecimal range of 0xAC00 to 0xD7A4 to determine Choseong, Jungseong, and Jongseong indices associated with an entry. The indices are based in part on the three nested program loops, described above in conjunction with FIGS. 2–3.

Process 500 begins, after a start block, at block 502, where a Hangul index is determined from the Unicode Standard code associated with a Hangul. At block 502, a base address is subtracted from the Unicode Standard code to enable zero-based addressing. In one embodiment, the hexadecimal base address is 0xAC00.

Process 500 proceeds to block 504, where a Choseong index is determined. The Choseong index may be determined by dividing the Hangul index determined at block 502 by the number of Hanguls that are produced by executing the two inner nested loops described above in conjunction with FIGS. 2–3. That is every pass of the outer program loop produces approximately 588 Hanguls. Dividing the Hangul index by about 588 and ignoring the remainder provides the Choseong index.

The process next proceeds to block 506, where the Jungseong index is determined. The Hangul index determined at block 502 is divided by about the number of Hanguls obtained from executing the two inner program loops in FIG. 3, or about 588. This effectively strips off the first loop. A remainder from the division is then employed to determine the Jungseong index by dividing by the size of the third inner nested program loop, or about 28, and ignoring the remainder.

Process 500 continues to block 508, where the Jongseong index is determined by dividing the Hangul index by the size of the inner loop (e.g., 28) and retaining the remainder (i.e., Hangul index MOD 28). This has the effect of stripping off the first two nested program loops and leaving only the third nested program loop. The remainder is employed to determine the Jongseong index.

The process proceeds next to block 510, where the Choseong, Jungseong, and Jongseong indices are employed to map to an associated keystroke that may produce the Hangul. Concatenation of the associated keystrokes provides a sequence of potential keystroke(s) that represent those keystrokes the user might enter for the Hangul associated with the entry. Upon completion of block 510, process 500 returns to performing other actions.

Figure 6:
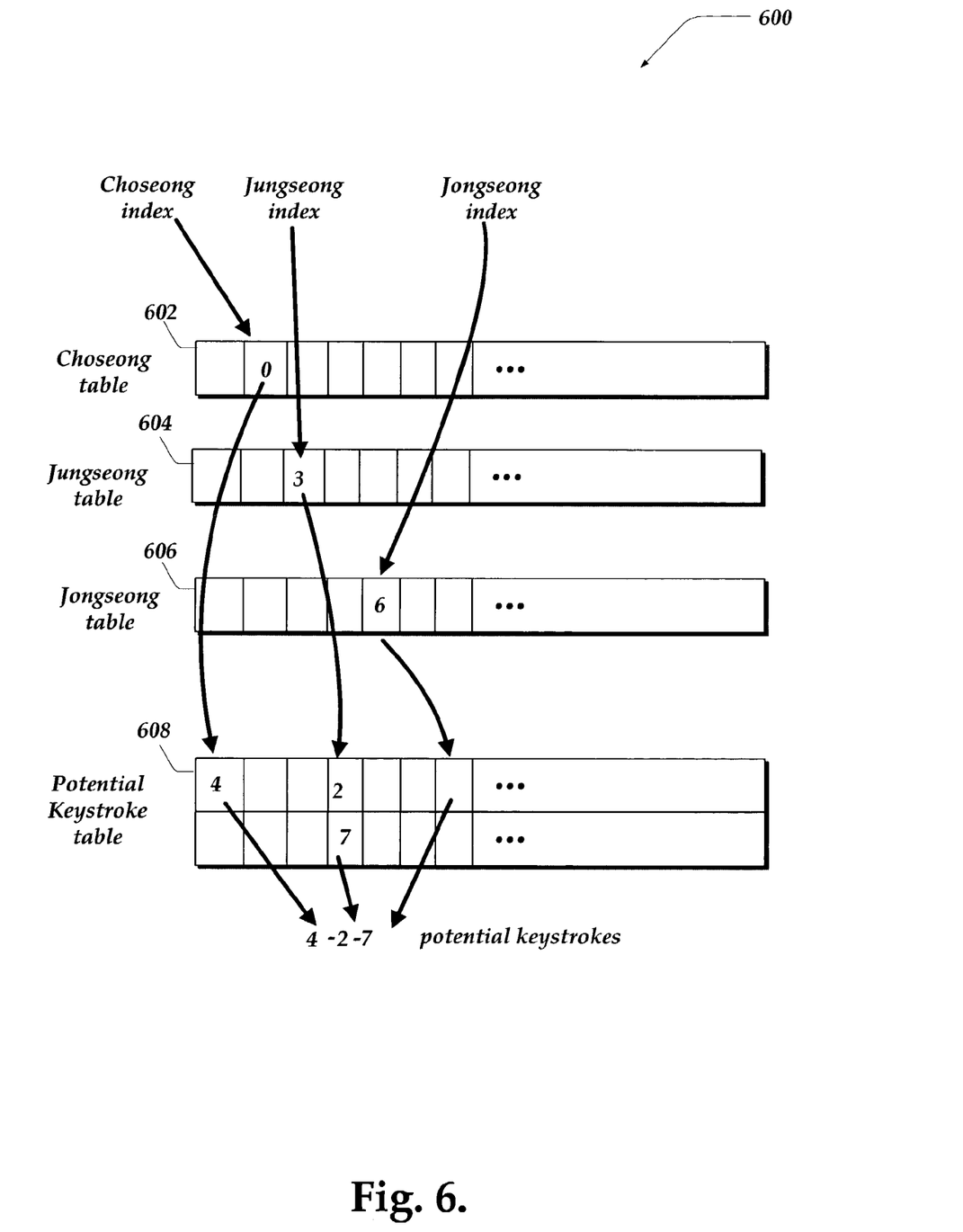
FIG. 6 is an illustrative diagram of one embodiment for indexing into a potential keystroke table associated with a Korean language character, in accordance with the present invention.

As a brief example of the above, FIG. 6 provides an illustrative diagram of one embodiment for determining a keystroke for a Korean language character, in accordance with the present invention. As shown in FIG. 6, the Choseong index obtained from Choseong table 602 is 0. The Jungseong index obtained from Jungseong table 604 is 3, and the Jongseong index obtained from Jongseong table 606 is 6, based on the mechanisms described above in conjunction with Process 500. Employing keystroke table 608 the keystroke associated with the Choseong index is determined as 4. Similarly, keystroke table 608 is employed to identify the keystroke associated with the determined Jungseong index as 2-7. As shown in FIG. 6, the keystroke associated with the determined Jongseong index indicates that no trailing consonant is associated with the received entry. The potential keystroke associated with the entry is determined in this example as 4-2-7.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A computer-implemented method for identifying a keystroke for a Far East language character, comprising:
   receiving a code associated with a Far East language character;
   determining an index based at least in part on the code associated with the Far East language character; wherein determining the index further comprises determining a Hangul value, wherein the Hangul value is approximately equal to the difference between the code and a base address; and
   employing the index to identify the keystroke, wherein the keystroke is associated with the Far East language character.

2. The method of claim 1, wherein determining the index further comprises determining a Choseong index by dividing the Hangul value by 588 and ignoring the remainder.

3. The method of claim 1, wherein determining the index further comprises determining a Jungseong index, wherein the Jungseong index is approximately the remainder of the Hangul value divided by 588.

4. The method of claim 1, wherein determining the index further comprises determining a Jongseong index, wherein the Jongseong index is approximately the remainder of the Hangul value divided by 28.

5. The method of claim 1, wherein employing the index further comprises selecting the keystroke based in part on the index into a table.

6. The method of claim 1, wherein the code is a Unicode Standard code.

7. The method of claim 1, wherein the code is associated with an entry in at least one of a database, contact list, call log, and a document.

8. A computer-readable medium having computer executable instructions for identifying a keystroke for a Far East language character, comprising:
   receiving a code associated with a Far East language character;
   determining an index based at least in part on the code associated with the Far East language character; wherein determining the index further comprises determining a Hangul value, wherein the Hangul value is approximately equal to the difference between the code and a base address; and
   employing the index to identify the keystroke, wherein the keystroke is associated with the Far East language character.

9. The computer-readable medium of claim 8, wherein determining the index further comprises determining a Choseong index by dividing the Hangul value by 588 and ignoring the remainder.

10. The computer-readable medium of claim 8, wherein determining the index further comprises determining a Jungseong index, wherein the Jungseong index is approximately the remainder of the Hangul value divided by 588.

11. The computer-readable medium of claim 8, wherein determining the index further comprises determining a Jongseong index, wherein the Jongseong index is approximately the remainder of the Hangul value divided by 28.

12. The computer-readable medium of claim 8, wherein employing the index further comprises selecting the keystroke based in part on the index into a table.

13. The computer-readable medium of claim 8, wherein the code is a Unicode Standard code.

14. The computer-readable medium of claim 8, wherein the code is associated with an entry in at least one of a database, contact list, call log, and a document.

* * * * *

UNITED STATES PATENT AND TRADEMARK OFFICE
CERTIFICATE OF CORRECTION

PATENT NO. : 7,002,491 B2
APPLICATION NO. : 10/287836
DATED : February 21, 2006
INVENTOR(S) : Daryn E. Robbins Page 1 of 1

It is certified that error appears in the above-identified patent and that said Letters Patent is hereby corrected as shown below:

On the Title page, in field (56), under "Other Publications", in column 2, line 1, after "Liu" delete "," and insert -- . --, therefor.

On the Title page, in field (56), under "Other Publications", in column 2, line 4, delete "pp. 1443-1449" and insert -- pp. 1443-1448 --, therefor.

In column 4, line 39, delete "email" and insert -- e-mail --, therefor.

Signed and Sealed this

Twenty-ninth Day of September, 2009

David J. Kappos
*Director of the United States Patent and Trademark Office*